Patented Feb. 24, 1948

2,436,519

UNITED STATES PATENT OFFICE 2,436,519

MANUFACTURE OF FLAKED CEREAL-SOYA PRODUCT

Charles E. Luke, Irwin, Pa., assignor, by mesne assignments, to General Foods Corporation, New York, N. Y., a corporation of Delaware No Drawing. Application October 11, 1943, Serial No. 505,803

7 Claims. (Cl. 99—83)

This invention relates generally to cereal products and to a process of making such products. More particularly, it relates to a fully or partially pre-cooked cereal product in the form of toasted flakes which possesses a high protein content, a high starch content and other constituents, such as minerals and substances high in vitamin content, desirable in food products, which flakes are strong, can be made of relatively large size and do not absorb large quantities of milk or cream.

The protein content of most cereal grains is relatively low. For example, corn, rice, wheat, barley and rye and the cereal products made therefrom all have a protein content ranging from approximately 8 to 13% by weight. Oats and the familiar rolled cereal product made therefrom, namely, rolled oats, have a protein content of about 16%, which is higher than the protein content of practically all other cereals. However, all of these cereal grains have a relatively high starch content ranging from about 68% to 78%.

The principal object of the present invention is to provide a cereal product in the form of strong flakes which possesses a high starch content and at the same time is high in proteins, minerals, vitamin-bearing substances and other valubale food constituents. By my invention I provide a cereal product of this character in which the protein content may be as high as 25 to 30%.

The soya bean, as is well known, has a relatively high food value. It is rich in proteins, having a minimum protein content of approximately 25% and a maximum of approximately 40%. It has an oil or fat content ranging from approximately 12% to 19%. It contains many desirable minerals, including calcium, sodium, potassium and iron. It also contains a long list of desirable amino acids. It also contains vitamins A, B', G, H and PP and other constituents high in vitamins, such as pantothenic acid, inositol and chloline.

Attempts have been made heretofore to produce a flaked cereal from soya beans with the idea of providing a cereal product having a high protein content, but, so far as I am aware, all such attempts have proved unsuccessful. Where soya beans alone are used for making a flaked or rolled product, there is not sufficient starch or other adhesive-like material present to bind the particles together and, consequently, a suitable flaked or rolled product cannot be made.

In order to try to overcome the lack of starch or other adhesive where soya bean flour is used as the only constituent in the production of a flaked product, I have attempted to make flaked cereal products by mixing soya bean flour and cereal flour such as wheat flour, corn flour, rice flour, barley flour or oats flour. I found that a satisfactory flaked and toasted product could not be made from such mixtures. In forming the flakes or in toasting the flakes the product crumbled, thereby preventing the formation of flakes of satisfactory size comparable with the well known cereal flakes such, for example, as wheat flakes. Believing that the lack of success in forming satisfactory strong flakes from the mixture was due to the oil content of the soya bean flour, I substituted soya bean flour from which a part of the oil had been extracted for the whole bean flour. I found that even this mixture would not produce flakes of satisfactory size and strength.

I attempted to utilize a mixture of cracked, cut or crushed cereal grains (as distinguished from cereal grain flour) and whole soya bean flour but found that a flaked cereal product could not be made successfully in this way. The oil in the soya bean flour evidently prevented it from adhering to the starch of the cracked cereal grains and as a consequence only a very small proportion of the soya bean flour remained in the finished product. I found, for example, that in attempts to manufacture a flaked wheat product in this way the protein content could be increased only approximately 1% regardless of the relative proportions of the cracked, crushed or cut wheat grains and the soya bean flour employed in the mixture.

I have found that the difficulties above mentioned can be obviated, the protein content of flaked cereal products can be greatly increased and strong firm flakes of relatively large size can be made provided that the cereal grain, such as wheat, corn, rice, oats, barley or rye, or other cereal grains having a substantial starch content, are of a certain minimum size which is many times larger than the size of the soya bean flour, and provided further that the soya bean flour does not contain over about 15% of oil by weight.

In carrying out my process I employ a mixture of cracked, cut or crushed cereal grains and soya bean flour, the soya bean flour containing not over about 15% of oil by weight. The cracked, cut or crushed cereal grains are of a size which are many times larger than the soya bean flour. Whereas the soya bean flour particles may be say 150 mesh, the cereal grain particles are at least 12 mesh or larger. In a preferred embodiment the cracked, cut or crushed cereal grain particles are about 8 mesh. The use of a mixture in which the cereal grains are of a relatively large size and the soya bean flour particles of a relatively small size, the soya bean flour containing not over about 15% of oil by weight results in a flaked and toasted product which is strong and firm so that flakes comparable in size to ordinary wheat or corn flakes can be made from the mixture. My product has a distinctly different "bite" when it is eaten as compared to a flaked product in which both the cereal grain and the soya bean are used in the form of a flour. Furthermore, due to the relatively large size of the cereal grain in my product, it absorbs less milk or cream and does not become soggy, as would be the case if it were made from cereal flour and soya bean flour.

The soya bean flour from which the oil has been extracted may be made by any desired method, one way being to press the soya beans to extract the oil and thereafter reduce the product to a flour. On the other hand, the soya beans might be treated with a solvent which extracts the oil and the product resulting from treatment with the solvent being then made into flour. Whatever method is employed in producing the soya bean flour, the flour should not contain over about 15% of oil by weight and preferably the oil content should be as low as possible. In the preferred soya bean flour the oil content ranges from about 0.5% to about 1.5% or 2%, but satisfactory flaked cereals may be made where the soya bean flour contains up to 10% or even up to about 15%. The lower the oil content of the soya bean flour is, the smaller is the amount of soya bean flour required to produce a given protein content in the finished product and the lower are the losses in forming and toasting the flakes.

In order to more clearly set forth my invention I shall describe it as applied to two specific known types of cereal products.

In the ensuing description my invention is described as applied to the manufacture of a flaked cereal product having a high protein content. In this example the method of making wheat flakes is described, but it will be understood that the same general procedure may be employed in making flakes from the other cereal grains such as rice, corn, barley, bran, rye or oats, or from a combination of these cereal grains.

The wheat grains are first cut, crushed or cracked and the soya bean flour from which the oil has been extracted or which in any event does not contain over about 15% by weight of oil is mixed with the cut, crushed or cracked wheat grains. It is preferred that the wheat grains be cut, cracked or crushed to one-half or one-third their original size so as to keep the amount of wheat flour produced to a minimum. Under such conditions the particles of cut, cracked or crushed wheat will be of about 8 mesh size. I may, however, use any size of cut, crushed or cracked wheat grains which is not smaller than about 12 mesh. The soya bean flour is of the usual particle size, for example, about 150 mesh. The preferred proportions of cracked wheat grains and oil extracted soya bean flour are about 60% of cracked wheat grains and 40% of soya bean flour. These proportions may be varied somewhat, however, depending upon the particular cereal which is being produced, i. e., whether it is a wheat, rice, corn, rye, oats or barley cereal, and also depending upon the amount of protein which is desired in the flaked product. Desirable products may be produced when the wheat or other grain constitutes about 50 to 80% and the oil extracted soya bean flour constitutes about 20 to 50% by weight of the mix. After the two materials are mixed together, seasoning such as sugar, salt and malt are added and the mixture is cooked under direct steam pressure. This causes the soya bean flour to adhere to the exposed starches in the wheat or other cereal grain particles. Thereafter the mixture is dried, tempered, rolled into flakes and toasted. By "tempering" it is meant that the material is permitted to stand for a period of time under proper conditions so that any remaining moisture content will be substantially equalized throughout the entire mass.

The preferred process just described results in wheat flakes having a protein content of approximately 26.5% by weight as compared with the usual protein content of about 10 to 13% found in ordinary wheat flakes. In addition, my product contains a variety of minerals, vitamins, amino acids and vitamin-bearing constituents not ordinarily present in wheat flakes or other similar cereals. The flakes are firm and strong because of the fact that the wheat particles are many times larger than the particles of soya bean flour. Because of the strength of the flakes they are of relatively large size as compared with a product made in a similar manner except that wheat flour is used in place of the relatively large wheat particles.

Although my invention is particularly adapted to the production of flaked cereals, it may be utilized in the manufacture of cereal products in the form of shreds or filaments. In the manufacture of biscuits from wheat shreds for example, the shreds are formed continuously by a plurality of pairs of rolls and are laid on a traveling conveyor. About 9 or 10 different layers of shreds or filaments are placed on each other and the bundle is cut to form the biscuit. According to the present invention the protein content of the biscuit made from wheat shreds or shreds of some other cereal grain can be increased by feeding soya bean flour onto the various layers of wheat shreds as they are laid on the conveyor. During this stage of the manufacture the wheat shreds are in a moist condition. The shreds or filaments of wheat contain ample starch to bind the soya bean flour to the shreds. The layers of shreds to which the soya bean flour has been applied are then formed into biscuits which are dried and toasted. In increasing the protein content of biscuits made from wheat shreds or filaments I preferably use soya bean flour containing not over about 15% by weight of oil but I may, if desired, use soya bean flour containing a higher percentage of oil.

It will be apparent from the description of the invention that dried and toasted cereal products in flaked, shredded, and other forms may be made according to the present invention and that such products have a greatly increased protein content as compared with the presently known cereal products. As an example, the protein content of wheat flakes may be increased from a content of about 10 to 13% to about 30%, thereby greatly increasing the nutrient value of the product.

My invention is not limited to the preferred process or to the preferred proportions of ingredients, but may be otherwise embodied or practiced within the scope of the following claims.

I claim:
1. The process of making a toasted, flaked cereal product having a high protein content from cereal grain having a low protein content, which comprises mixing soya bean flour containing not over about 15 percent of oil with cereal grain particles appreciably larger than flour size, cooking the mix, forming flakes from the mix, and toasting the flakes.

2. The process of making a toasted, flaked cereal product having a high protein content from cereal grain having a low protein content, which comprises mixing soya bean flour containing not over about 15 percent of oil with cereal grain particles at least as large as 12 mesh to the inch, cooking the mix, forming flakes from the mix, and toasting the flakes.

3. The process of making a toasted, flaked cereal product having a high protein content from cereal grain having a low protein content and of the group consisting of corn, wheat, rice, oats, barley and bran, which comprises mixing soya bean flour containing not over about 15 percent of oil with cereal grain particles at least as large as 12 mesh, cooking the mix, forming flakes from the mix, and toasting the flakes.

4. The process of making a toasted, flaked cereal product having a high protein content from cereal grain having a low protein content and a high starch content, which comprises mixing soya bean flour containing not over about 10 percent of oil with cereal grain particles at least as large as 12 mesh, cooking the mix, forming flakes from the mix, and toasting the flakes.

5. The process of making a toasted, flaked cereal product having a high protein content from cereal grain having a low protein content, which comprises mixing soya bean flour containing not over about 15 percent of oil with cereal grain particles appreciably larger than flour size, the mix containing from about 20 percent to 50 percent by weight of soya bean flour, cooking the mix, forming flakes from the mix, and toasting the flakes.

6. The process of making a toasted, flaked cereal product having a high protein content from cereal grain having a low protein content and of the group consisting of corn, wheat, rice, oats, barley and bran, which comprises mixing soya bean flour containing not over about 15 percent of oil with cereal grain particles appreciably larger than flour size, the mix containing about 40 percent of soya bean flour and about 60 percent of cereal grain particles, cooking the mix, forming flakes from the mix, and toasting the flakes.

7. The process of making a toasted, flaked cereal product having a high protein content from cereal grain having a low protein content and a high starch content, which comprises mixing soya bean flour containing not over about 15 percent of oil with cereal grain particles appreciably larger than flour size, cooking the mix under direct steam pressure, drying, tempering and rolling the mix into flakes and thereafter toasting the flakes.

CHARLES E. LUKE.

REFERENCES CITED

The following references are of record in the file of this patent:

UNITED STATES PATENTS

| Number | Name | Date |
|---|---|---|
| 1,260,656 | Bollmann | Mar. 26, 1918 |
| 1,430,670 | Morgan | Oct. 3, 1922 |
| 2,098,544 | Hill | Nov. 9, 1937 |
| 2,130,087 | Hasbrouck | Sept. 13, 1938 |
| 2,260,254 | Kruse | Oct. 21, 1941 |